United States Patent [19]
Fincher

[11] Patent Number: 5,721,475
[45] Date of Patent: Feb. 24, 1998

[54] EXTENDED-RESOLUTION PULSE-WIDTH MODULATION SERVOMOTOR DRIVE

[75] Inventor: Clinton A. Fincher, Redwood City, Calif.

[73] Assignee: Ampex Corporation, Redwood City, Calif.

[21] Appl. No.: 742,257

[22] Filed: Oct. 31, 1996

[51] Int. Cl.$^6$ ..................................... G05B 11/28
[52] U.S. Cl. .................. 318/599; 318/600; 318/254; 318/138; 318/439
[58] Field of Search ..................... 318/599, 600, 318/798–815, 280, 439, 254, 138

[56] References Cited

U.S. PATENT DOCUMENTS

| | | |
|---|---|---|
| 3,879,647 | 4/1975 | Hamilton et al. .................. 321/2 |
| 4,233,591 | 11/1980 | Murata et al. . |
| 4,488,103 | 12/1984 | Morinaga et al. . |
| 4,590,457 | 5/1986 | Amir . |
| 4,709,416 | 11/1987 | Patterson .................. 455/609 |
| 4,742,329 | 5/1988 | Yamada et al. . |
| 4,901,078 | 2/1990 | Goyal . |
| 4,930,060 | 5/1990 | Leonardi .................. 363/21 |
| 5,023,535 | 6/1991 | Miller et al. . |
| 5,177,373 | 1/1993 | Nakamura . |
| 5,216,374 | 6/1993 | George et al. . |
| 5,422,597 | 6/1995 | Stengel et al. . |
| 5,471,505 | 11/1995 | Birangi et al. . |
| 5,583,402 | 12/1996 | Moisin et al. .................. 315/226 |
| 5,637,971 | 6/1997 | Pratt .................. 318/138 X |

*Primary Examiner*—Karen Masih
*Attorney, Agent, or Firm*—John G. Mesaros; James M. Thomson; Patrick O'Shea

[57] ABSTRACT

Drivers (24, 26, and 28) in the controller for a motor (14) drive the motor in accordance with a pulse-width-modulation scheme in which each pulse-width-modulation cycle includes a positive interval and a negative interval so that the value of the filtered output is proportional to the difference in duration between the positive and negative intervals. The pulse-width-modulator cycle also includes dead times between the positive and negative intervals, and these dead times are varied so that a change in a positive interval's duration in a fixed-duration pulse-width-modulation cycle does not necessarily result in an opposite change in the negative interval's duration. Consequently, the value resolution for a system in which the pulse-width-modulation cycle is a given number of system clock periods can be finer than it would be if the dead-time interval's duration were fixed.

2 Claims, 3 Drawing Sheets

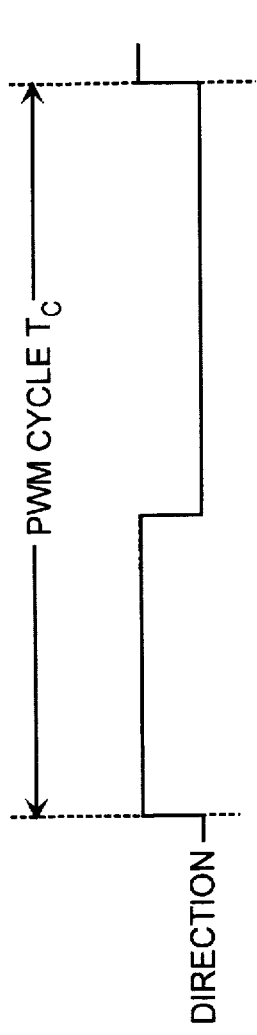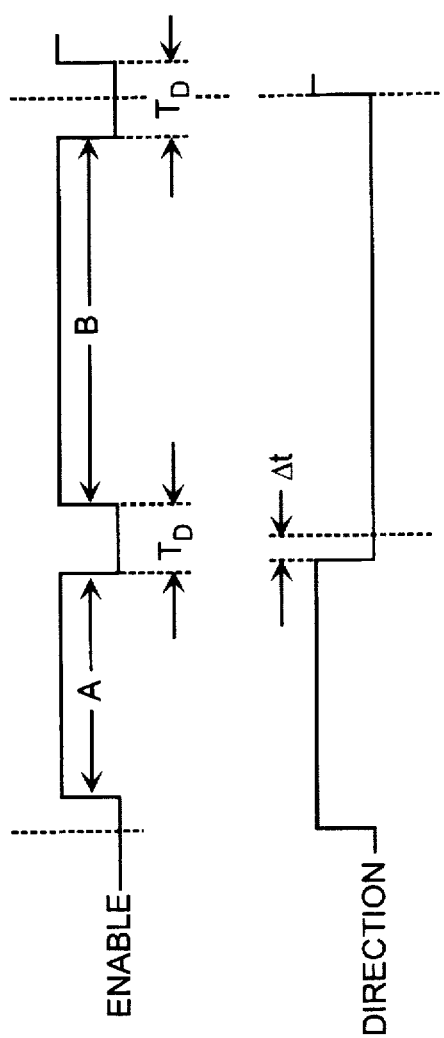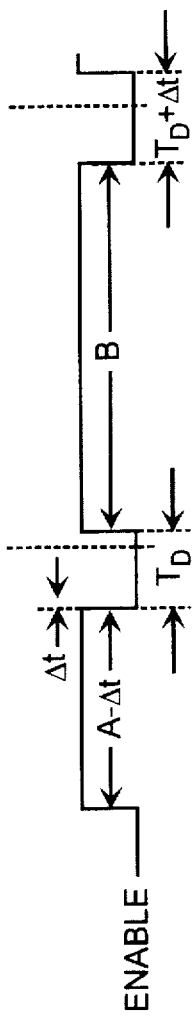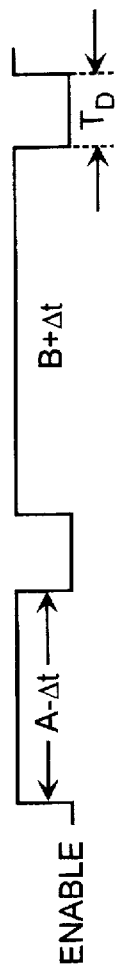

EXTENDED-RESOLUTION PULSE-WIDTH MODULATION SERVOMOTOR DRIVE

BACKGROUND OF THE INVENTION

The present invention is directed to motor control. In particular, it concerns digital motor-control systems that employ pulse-width modulators to develop their motor-drive signals.

FIG. 1 illustrates a typical control system of the type that can employ pulse-width modulation to develop its motor-control signals. A digital controller 10 typically receives outputs from a position encoder 12, which monitors the shaft angle and speed of a motor 14 to be controlled. In the illustrated system, in which motor 14 is a three-phase-motor the controller 10 determines from those outputs the values of the drive signals to be applied to the motor 14's three-phase windings. It sends digital signals representing a sequence of these values to circuitry for converting those conventional digital signals into pulse-width-modulation signals. Since there are three motor phases, the circuitry must generate three pulse-width-modulation signals, and FIG. 1 accordingly depicts the pulse-width-modulation circuitry as including parts 16, 18, and 20 dedicated to generating respective pulse-width-modulation signals. But the pulse-width-modulation circuitry may also have components that perform some of the processing for all three signals in common, and FIG. 1 represents these by a further block 22. Of course, such a segregation of functions is not a necessary feature of pulse-width-modulation systems.

FIG. 1 depicts the pulse-width-modulation signals as being applied to respective driver circuits 24, 26, and 28, which in turn drive respective low-pass filters 30, 32, and 34. FIG. 2 illustrates how the pulse-width-modulation signals may be applied to one of the drivers, say, driver 24. When a first power transistor Q1 is turned on, it connects the input terminal of low-pass filter 30 to a 40-volt supply rail. When a second power transistor Q2 is turned on, it connects filter 30's input terminal to ground.

To this end, driver 24's gates 36 and 38 receive ENABLE and DIRECTION signals of the type that FIGS. 3A and 3B illustrate. The servocontroller 10 sends a sequence of values representing, typically, a sinusoidal signal. A new value occurs once each PWM cycle, which may be, say, 5 microseconds in duration. During each PWM cycle, the ENABLE and DIRECTION signals cause positive and negative intervals, during which power transistors Q1 and Q2 are respectively operated.

Specifically, the DIRECTION signal is asserted at the beginning of the cycle so as to permit transistor Q1 to drive the filter but prevent transistor Q2 from being driven. The DIRECTION signal then changes state to permit driving by transistor Q2 and prevent driving by transistor Q1. However, response delays could cause both transistors to be conducting simultaneously if they were gated only by the DIRECTION signal, and they could thus short the supply rails together. To prevent this, the ENABLE signal disables both transistors for a period $T_D$, which gives one transistor time to turnoff before the other transistor begins driving the filter.

Now, although the filter output is always positive with respect to ground in the FIG. 2 example, the quantities of interest in driving the three-phase motor are the phase voltages' relative values, so it is convenient to refer to the filter output as referenced to the value halfway between the two supply rails, i.e., to the potential 20 volts above ground. If we adopt this convention, then the filter output for a given PWM cycle is an analog value proportional to the difference between the duration A of the first, positive ENABLE interval and the second, negative ENABLE interval. Since the duration of the negative interval exceeds that of the positive interval in the FIG. 3 cycle, the resultant filter output is negative.

As is the case with most digital circuitry, the servocontroller 10 and the pulse-width-modulation components 16, 18, 20, and 22 operate by reference to a basic clock, so the durations of the positive and negative intervals must necessarily be integer multiples of that clock's period. The system clock frequency therefore determines the resolution with which the system can specify the desired output for a given PWM-cycle duration. That is, if the PWM cycle is N clock periods in duration, the driving direction specified by the DIRECTION signal can change at one of only N possible times during that cycle, so there are only N possible values that the system can specify. One can obtain finer resolution by increasing the cycle duration, but doing so can result in too narrow a control-loop bandwidth. Alternatively, increasing the system clock frequency can also produce greater resolution, but increasing system clock frequency is only occasionally practical.

SUMMARY OF THE INVENTION

I have recognized that the value resolution in such a system can be doubled without increasing either the cycle duration or the clock frequency. This result is achieved by varying not only the time in the cycle at which the direction is changed but also the length of the dead time, during which the filter is driven to neither level. In the conventional system, in which the dead-time duration is fixed, a change in the positive interval's duration necessarily results in an opposite change in the negative interval's duration. This means that the duration difference, which determines the analog output value, changes by twice the duration change of the positive interval.

In contrast, the present invention permits the same value change to be made in two steps. In accordance with the present invention, a change in the positive interval's duration can be accompanied by an opposite change in the dead-time duration, and the negative interval's duration can thus remain the same. So the duration-difference change is equal only to the positive interval's duration change, not twice that interval's duration change. A subsequent negative-interval duration change opposite that of the previous positive-interval duration change can be accompanied by an opposite change in the dead-time duration, again resulting in an interval-difference change only half the minimum change afforded by the conventional system. The invention thus yields twice the resolution at virtually no cost.

BRIEF DESCRIPTION OF THE DRAWINGS

The invention description below refers to the accompanying drawings, of which:

FIGS. 3A and 3B are timing diagrams depicting control signals of the type that a prior-art pulse-width-modulator employs; and FIGS. 4A-C are similar timing diagrams depicting control signals of the type that a typical embodiment of the present invention employs.

DETAILED DESCRIPTION OF AN ILLUSTRATIVE EMBODIMENT

Figure 1:
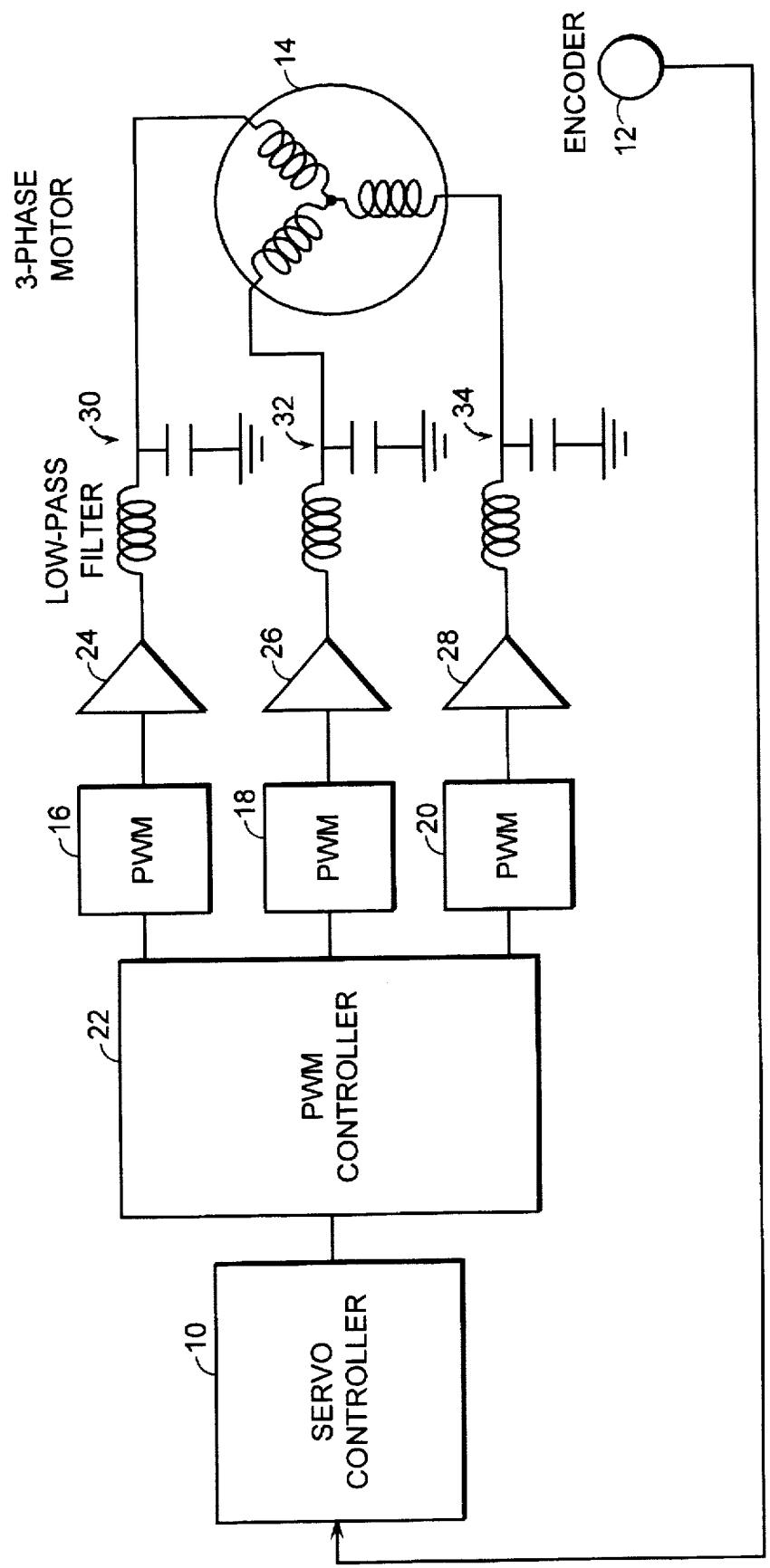
FIG. 1 is a block diagram of a motor controller in which the present invention can be practiced.
Figure 2:
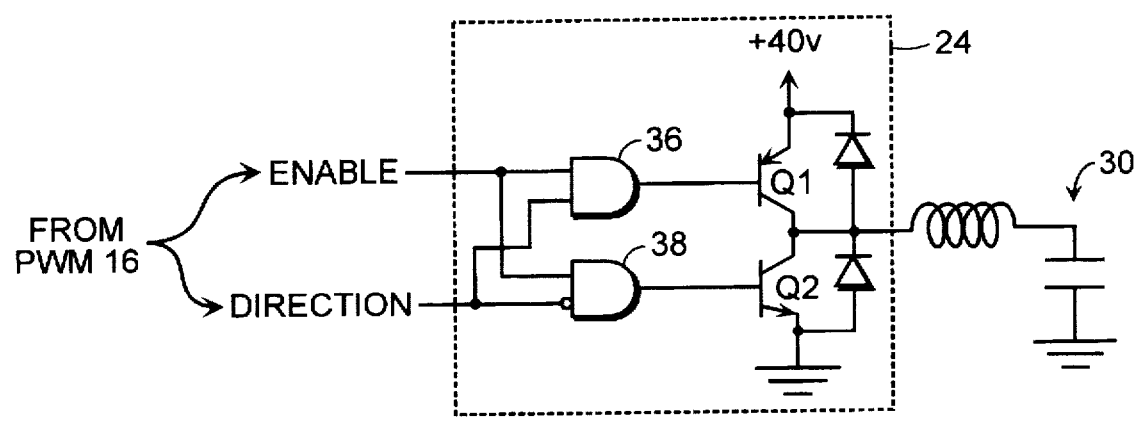
FIG. 2 is a schematic diagram of one of the drivers and associated low-pass filter in the motor controller of FIG. 1.

In FIG. 4A, the DIRECTION signal is the same as that in FIG. 3A, with the exception that it is intended to represent a more-negative signal, so the DIRECTION signal switches from the positive-indicating level to the negative-indicating level one system clock time $\Delta t$ earlier than in FIG. 3A. In the ENABLE signal of FIG. 4B, the first enabling interval similarly ends earlier by $\Delta t$, beginning a conventional dead time of duration $T_D$. The end of this dead time in turn begins the second, negative interval, which also begins one clock time $\Delta t$ earlier than in FIG. 3.

In a conventional system, this change in the DIRECTION signal by one clock time $\Delta t$ would result in a change of $2\Delta t$ in the interval-duration difference, because the positive interval would be shorter by one clock time, while the negative interval would be longer by one clock time. But the dead time that brackets the end of the cycle in the present invention's illustrated embodiment is $T_D+\Delta t$: the dead time, too, is greater by one clock time than the corresponding dead time in FIG. 3B. So although the positive interval is indeed shorter by one clock time, the negative interval is not, and the change in the interval-duration difference, which determines the filter output, is only one clock time.

To make the output one step more negative than FIG. 4A and 4B's signals produce, the ENABLE signal changes from that of FIG. 4B to that of FIG. 4C, but the DIRECTION signal remains the same as that in FIG. 4A. In FIG. 4C, the duration of the end-of-cycle dead time has returned to the conventional duration $T_D$ and the negative interval has thus increased in duration by $\Delta t$ without a corresponding reduction in the positive interval's duration.

There are thus two output levels for each DIRECTION-signal switching time, rather than one as is the case in conventional systems, so the present invention yields twice the resolution has conventional systems do for a given PWM cycle and system-clock frequency. It therefore constitutes a significant advance in the art.

What is claimed is:

1. A servosystem comprising:
    A) a motor;
    B) a pulse-width modulator that generates, in response to a pulse-width-modulator input signal representing an input sequence whose elements are chosen from a finite set of digital values, a pulse-width-modulator output signal including a plurality of pulse-width-modulation cycles associated with respective elements of the input sequence, each pulse-width-modulation cycle consisting of a positive interval, a negative interval, and a neutral interval, the difference between the durations of the positive and negative intervals being proportional to the value of the input-sequence element with which that pulse-width-modulation cycle is associated, the neutral intervals differing in at least some pairs of pulse-width-modulation cycles that both have non-zero positive- and negative-interval durations and are associated with input-sequence elements representing successive members of the finite set of digital values; and
    C) a motor driver that drives the motor in accordance with the pulse-width-modulator output signal.

2. A servosystem as defined claim 1 wherein:
    A) the pulse-width-modulation cycle is equal in duration to an integral number of clock periods;
    B) each of the positive, negative, and neutral intervals is equal in duration to an integral number of clock periods; and
    C) there is a difference of one clock period between the durations of the neutral intervals of at least some pairs of modulation cycles that are associated with input-sequence elements representing successive members of the finite set of digital values.

* * * * *